(No Model.)

J. A. CHAPMAN.
FRUIT GATHERER.

No. 424,271. Patented Mar. 25, 1890.

WITNESSES:
Edwin L. Bradford
C. D. Davis

INVENTOR
James A. Chapman
BY C. M. Alexander
ATTORNEY.

UNITED STATES PATENT OFFICE.

JAMES A. CHAPMAN, OF LAKELAND, FLORIDA.

FRUIT-GATHERER.

SPECIFICATION forming part of Letters Patent No. 424,271, dated March 25, 1890.

Application filed October 24, 1889. Serial No. 328,103. (No model.)

*To all whom it may concern:*

Be it known that I, JAMES A. CHAPMAN, a citizen of the United States, residing at the town of Lakeland, in the county of Polk, State of Florida, have invented a new and useful Improvement in Fruit-Conveyers, as shown in the following specification.

My invention relates to devices for conveying fruit from among the branches of a tree to the ground or a receptacle on the ground without bruising or injuring it, as will presently appear.

Figure 1:
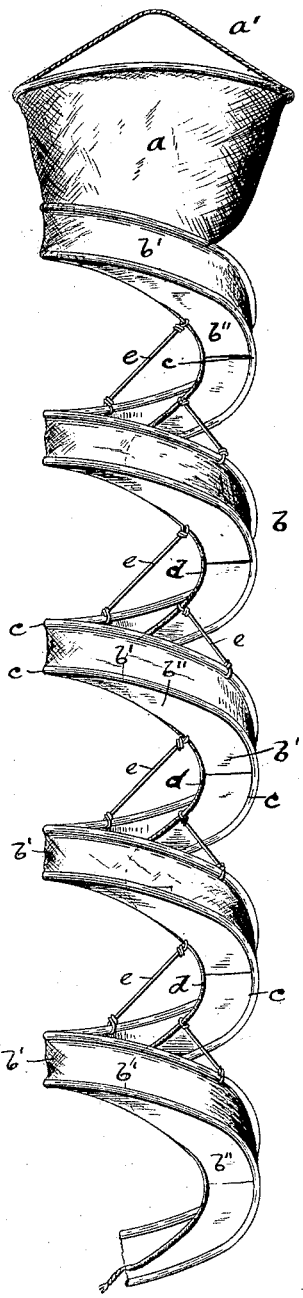
Figure 2:
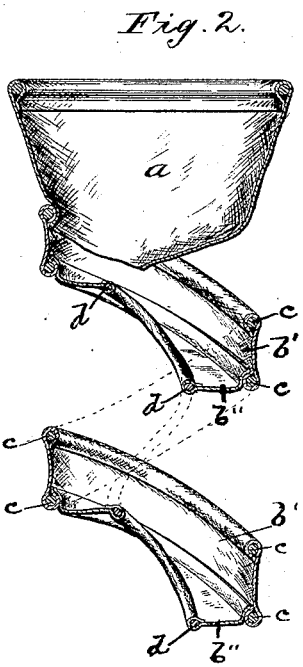

In the drawings annexed, Figure 1 represents a side elevation of my improved conveyer, and Fig. 2 a sectional view of a portion of the same.

A conical hopper $a$, of canvas or other strong fabric, is provided with a bail or loop $a'$ for convenience in hanging to an adjacent limb of the fruit-tree to be stripped. Depending from the lower opening in this hopper is an open spiral trough $b$, which conducts the fruit to the ground. This trough is constructed of an outer side $b'$ and an inwardly-turned floor or bottom $b''$, the side and bottom being both constructed of canvas or other suitable fabric, so that the fruit will not be injured in rolling down the trough. The sides of the trough are stiffened and supported by spirally-arranged parallel wires $c\ c$, sewed in the upper and lower edges of the canvas and extending from the hopper to the ground. The inner spiral edge of the floor $b''$ of the trough is supported by means of a spirally-arranged cord or rope $d$, sewed or hemmed in the canvas and extending the full length of the trough, the outer edge of the floor being sewed to the lower edge of the side, as shown.

The fruit may be dropped into the hopper or it may be dropped into the trough at any point in its length. In either case the fruit will roll gently and slowly to the ground without bruise or injury.

Braces $e$, connecting the central spiral cord $d$ to the outer wires, are provided for keeping the parts in their proper relative position.

A prominent advantage arising from this construction of open trough is that the fruit may be dropped into it at any point throughout its length, thereby enabling a number of persons to "pick" into the one trough or conveyer.

It is evident that the conveyer may be hung or secured to a ladder and moved around with the same, which is probably the most convenient manner of using it.

Having described my invention, what I claim is—

1. The combination, in a fruit-conveyer, of a hopper and an open spiral trough depending from this hopper, this trough being constructed of fabric and stiffened and supported by wires, substantially as described.

2. The combination, with a hopper, of an open spiral trough depending from this hopper, this trough being constructed of an outer canvas side stiffened by parallel wires, and a floor supported by a spiral cord, substantially as described.

3. The combination, in a fruit-conveyer, of an open spiral trough consisting of an outer canvas side stiffened by spiral wires and a canvas bottom or floor supported by a spiral cord, and braces or tie-rods $e$, connecting the central supporting-cord with the stiffening-wires of the side, substantially as described.

JAMES A. CHAPMAN.

Witnesses:
JNO. W. TRAMMELL,
R. O. PARK.